(12) United States Patent  (10) Patent No.: US 8,218,250 B2
Nakamura  (45) Date of Patent: Jul. 10, 2012

(54) LENS BARREL AND OPTICAL APPARATUS

(75) Inventor: Hidekazu Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/185,539

(22) Filed: Jul. 19, 2011

(65) Prior Publication Data

US 2012/0019933 A1  Jan. 26, 2012

(30) Foreign Application Priority Data

Jul. 20, 2010  (JP) .................................. 2010-162564

(51) Int. Cl.
    *G02B 15/14*  (2006.01)
(52) U.S. Cl. .......................... 359/700; 359/699; 359/701
(58) Field of Classification Search .................. 359/694, 359/699, 700, 701, 819, 823
    See application file for complete search history.

(56) References Cited

U.S. PATENT DOCUMENTS 7,839,579 B2 * 11/2010 Iwasaki .......................... 359/700

FOREIGN PATENT DOCUMENTS

JP          3328036 B2      9/2002

* cited by examiner

*Primary Examiner* — Jack Dinh
(74) *Attorney, Agent, or Firm* — Rossi, Kimms & McDowell LLP

(57) ABSTRACT

A lens barrel includes a cam ring driving unit including a moving frame, a linear driving unit that includes a holding frame configured to hold an image pickup element, and a guide bar that is engaged with the holding frame, extends in the optical axis direction, and is configured to guide a linear movement of the holding frame in the optical axis direction, and an intermediate fixing lens unit configured still in the optical axis direction. The cam ring driving unit is arranged on an object side of the intermediate fixing lens unit, the linear driving unit is arranged on an image pickup element side of the intermediate fixing lens unit, and the lens barrel is configured dividable into the cam ring driving unit, the linear driving unit, and the intermediate fixing lens unit.

4 Claims, 4 Drawing Sheets

LENS BARREL AND OPTICAL APPARATUS

BACKGROUND OF THE INVENTION

1. Field of the Invention

The present invention relates to a lens barrel and an optical apparatus.

2. Description of the Related Art

Japanese Patent No. 3,328,036 discloses a mirror frame moving unit that is provided at least one of a lens holding frame and an opposite surface of another frame, and includes a reference guide parallel to an optical axis, and a forcing unit configured to apply a force so as to bring both frames into contact via the reference guide. Thereby, Japanese Patent No. 3,328,036 applies a side pressure to the lens holding frame in the zoom lens barrel, prevents optical-axis fluctuations, stabilizes an image, and restrains blurs in a screen. In addition, the forcing unit positions the cam ring in the optical axis direction, and thus miniaturizes the barrel.

However, Japanese Patent No. 3,328,036 has a problem in that due to a sliding load in moving a comparatively heavy lens holding frame, the sliding sounds (noises) occur in the zooming time and in the motion image photography. One conceivable solution for this problem is a method of mounting an image pickup element onto the movable holding frame, but this method requires a driving member and a guide member used to move back and forth each movable holding frame in the optical axis direction, causing the lens barrel to be larger.

SUMMARY OF THE INVENTION

The present invention provides a lens unit and an optical apparatus having the same, which can prevent optical-axis fluctuations by a small and quiet configuration.

A lens barrel according to the present invention a cam ring driving unit including a moving frame that is configured to hold a lens unit and includes a cam follower, and a cam ring that includes a cam groove engaged with the cam follower, the cam ring being configured to rotate around the optical axis and thereby to drive the lens unit in an optical axis direction, a linear driving unit that includes a holding frame configured to hold an image pickup element configured to provide a photoelectric conversion to an optical image of an object, and a guide bar that is engaged with the holding frame, extends in the optical axis direction, and is configured to guide a linear movement of the holding frame in the optical axis direction, and an intermediate fixing lens unit configured still in the optical axis direction. The cam ring driving unit is arranged on an object side of the intermediate fixing lens unit, the linear driving unit is arranged on an image pickup element side of the intermediate fixing lens unit, and the lens barrel is configured dividable into the cam ring driving unit, the linear driving unit, and the intermediate fixing lens unit.

Further features of the present invention will become apparent from the following description of exemplary embodiments with reference to the attached drawings.

DESCRIPTION OF THE EMBODIMENTS

Figure 1:
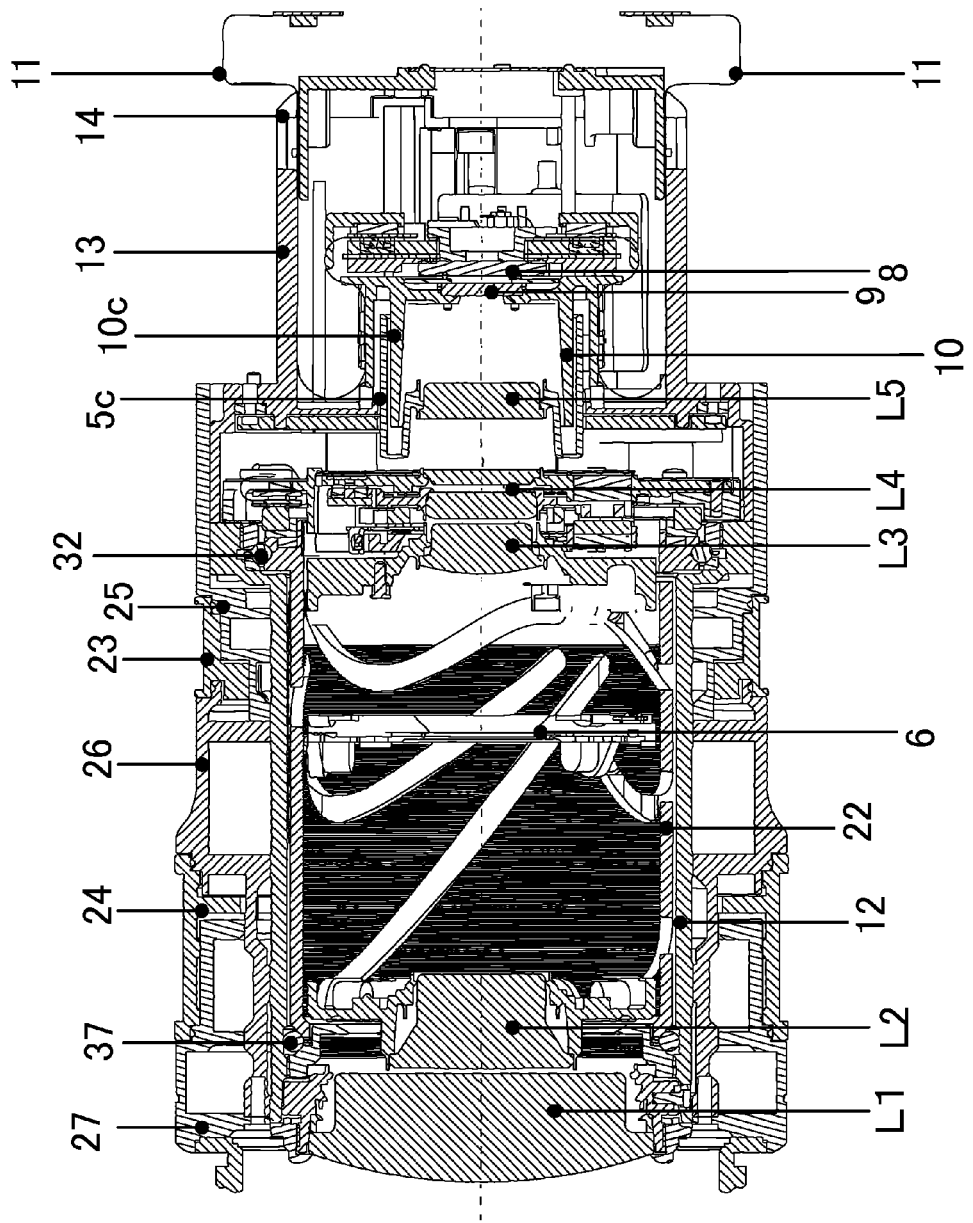
FIG. 1 is a sectional view of a lens barrel of a video camera according to this embodiment.
Figure 2:
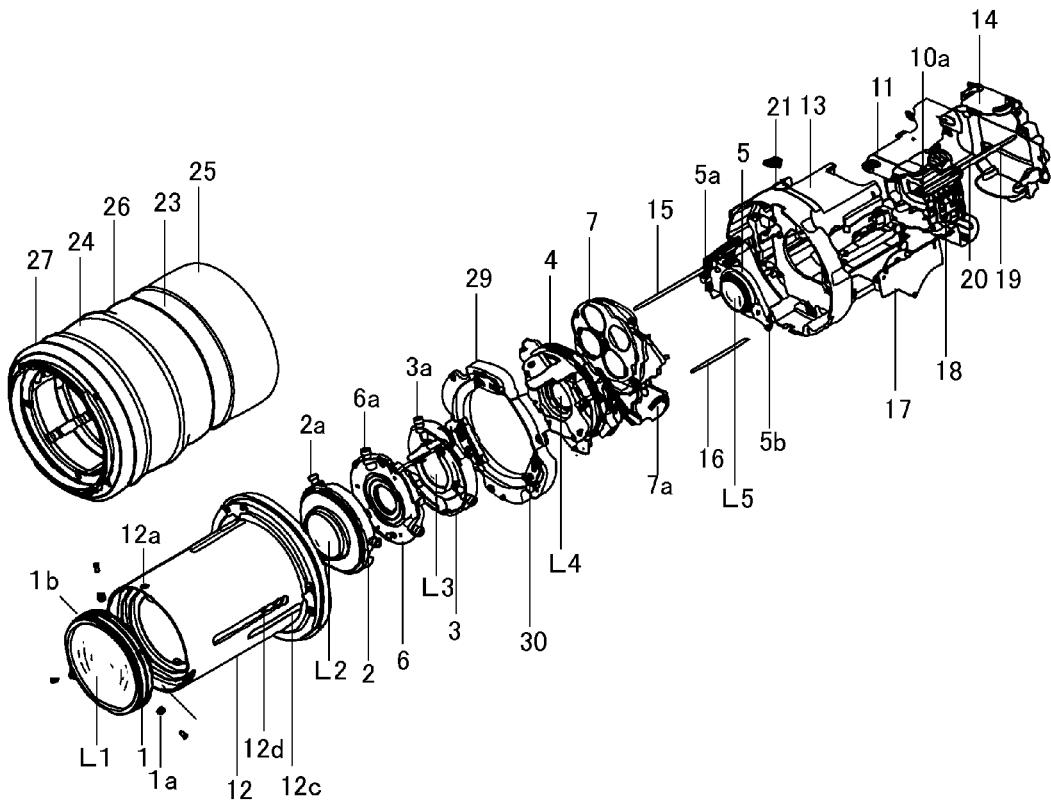
FIG. 2 is an exploded perspective view of the lens barrel illustrated in FIG. 1.

FIG. 1 is a sectional view of a lens barrel of a video camera (optical apparatus) according to this embodiment, and FIG. 2 is its exploded perspective view. The lens barrel includes a magnification varying optical system (zoom optical system) as an image pickup optical system configured to form an optical image, which includes, in order from the object side, five (convex/concave/convex/concave/convex) lens units. In the following description, the front side denotes the object side (left side in the drawing), and the backside denotes the image pickup element side.

The image pickup optical system includes first to fifth lens units L1 to L5 in order from the object side. The first lens unit L1 is fixed in the optical axis direction. The second lens unit L2 and the third lens unit L3 are configured to move in the optical axis direction for magnification variations (zooming). The fourth lens unit L4 is configured to move in the direction orthogonal to the optical axis for image stabilization. The fifth lens unit L5 is configured to move in the optical axis direction for focusing.

Reference numeral 1 denotes a fixed front barrel configured to hold the first lens unit L1, and three cam followers 1a integrally formed at regular angular intervals of approximately 120° on the front barrel 1 are engaged with corresponding through-holes 12a formed at regular angular intervals of approximately 120° in the fixed barrel 12. The first lens unit L1 is positioned and held due to the engagements between the three cam followers 1a and the three through-holes 12a of the fixed barrel 12 and the engagement between the outer circumference 1b of the front barrel 1 and the inner circumference 12b of the fixed barrel 12.

Reference numeral 2 denotes a second moving frame which is configured to hold the second lens unit L2 and has three cam followers 2a. Reference numeral 3 denotes a third moving frame which is configured to hold the third lens unit L3 and has three cam followers 3a. Reference numeral 4 denotes a shift unit (intermediate fixing lens unit) configured to hold and move the fourth lens unit L4 in the direction orthogonal to the optical axis without moving the fourth lens unit L4 in the optical axis direction. The shift unit 4 is positioned and fixed relative to the fixed barrel 12.

Reference numeral 5 denotes a fifth moving frame configured to hold the fifth lens unit L5. Reference numeral 6 denotes a light quantity control unit configured to adjust a light quantity that reaches the image pickup element configured to convert into an electric signal an optical image formed by light that has passed an aperture stop from the image pickup optical system. Reference numeral 7 denotes an ND unit having manually operated four-stage exposure switches, and the ND unit is not operated in the optical axis direction and fixed onto a rear barrel 13.

Reference numeral 23 denotes a zoom ring as a manipulator to be manually operated from the outside. The zoom ring 23 is engaged with the inner circumference of the zoom ring fixing barrel 25, configured rotatable approximately around the optical axis, and held between the zoom ring fixing barrel 25 and the intermediate barrel 26 with a minimum clearance in the optical axis direction.

Reference numeral 24 denotes a focus ring. The focus ring 24 is engaged with an outer circumference of the focus ring fixing barrel 27, configured rotatable approximately around the optical axis, and held between the focus ring fixing barrel 27 and the intermediate barrel 26 with a minimum clearance in the optical axis direction.

Rotational position detectors (not illustrated) each configured to detect a rotational amount of corresponding rings are provided on the inner circumference side of each of the zoom ring 23 and the focus ring 24, to detect an output signal corresponding to the rotational amount of each of the zoom ring 23 and the focus ring 24, and to perform operational processing for the output signal.

The ND base 7a of the ND unit 7 is positioned and fixed onto the rear barrel 13, and two guide bars 19 and 20 are fixed between the rear barrel 13 and the ND base 7a. A sleeve portion 5a provided to the fifth moving frame 5 is movably engaged with the guide bar 19. A U-shaped groove portion 5b provided in the fifth moving frame 5 is movably engaged with the guide bar 20, and prevents the rotation of the fifth moving frame 5 around the guide bar 19.

Reference numeral 21 denotes a slider (contact member) positioned and fixed onto the rear barrel 13 that is made of a magnet and a friction material. An oscillator (not illustrated) is positioned and fixed onto the fifth moving frame 5, and includes an electromechanical energy conversion element and a plate-shaped elastic member on which vibrations are excited by the electromechanical energy conversion element. The elastic member of the oscillator is ferromagnetic, and as the ferromagnetic member is attracted by the magnet of the slider 21, a pressed contact surface of the friction material of the slider is compressed against two pressed contact surfaces that are aligned in the optical axis direction in the elastic member of the oscillator.

In the oscillation-type linear actuator that includes the slider 21 and the oscillator, two frequency signals (pulsed signal or alternate signal) having different phases are input to the electromechanical energy conversion element via the flexible printed circuit board (not illustrated). Thereby, an approximate ecliptic motion occurs on the pressed contact surface of the oscillator, and a driving force in the optical axis direction occurs in the pressed contact surface of the slider 21.

Figure 3:
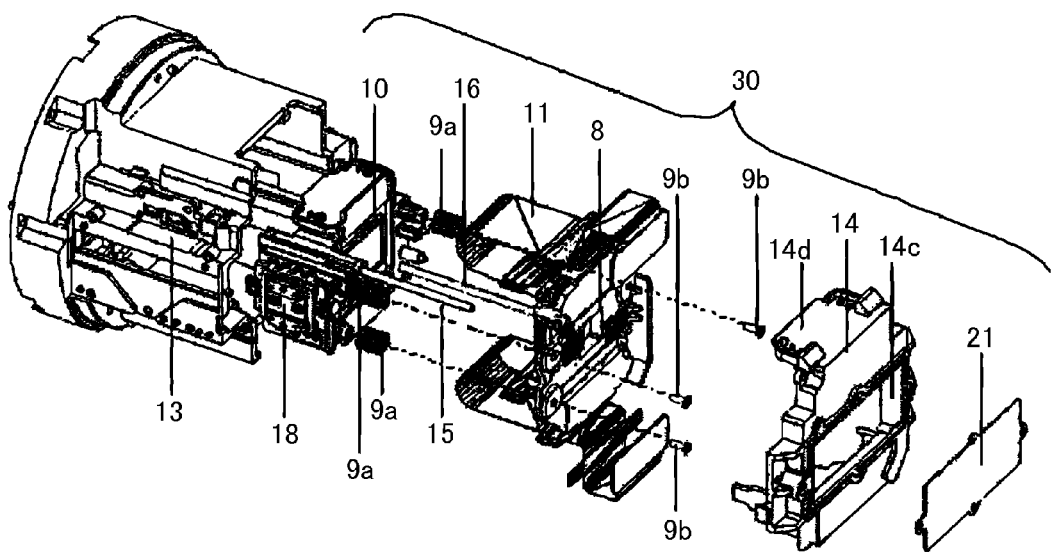
FIG. 3 is an exploded perspective view of an image pickup element unit illustrated in FIG. 2.

FIG. 3 is an exploded perspective view of the image pickup element unit 30.

Reference numeral 10 denotes a holding frame configured to hold an image pickup element 8, such as a CCD sensor and a CMOS sensor, configured to provide a photoelectric conversion into an electric signal an optical image formed by the light that has passed the aperture stop and an optical filter, such as an infrared cutting low-pass filter 9. The image pickup element 8 serves as a magnification variation unit configured to move in the optical axis direction for a magnification variation in synchronous control with the second lens unit L2 and the third lens unit L3. Reference numeral 9a denotes a compression spring as an optical adjusting unit, and reference numeral 9b denotes a screw.

Reference numeral 14 denotes a rear cover, which includes a guide bar holder (not illustrated), an opening 14c, and an FPC guide member 14d, and is positioned and fixed onto the rear barrel 13. Two guide bars 15 and 16 are fixed onto the guide bar holder of the rear cover 14 and the guide bar holder formed on the rear barrel 13 (not illustrated). A sleeve portion 10a provided onto the holding frame 10 is engaged with the guide bar 15 so that the sleeve portion 10a can linearly move, and the sleeve portion 10a is guided in the optical axis direction. In addition, the U-groove (not illustrated) provided onto the holding frame 10 is movably engaged with the guide bar 16, and the rotation of the holding frame 10 around the guide bar 15 is prevented.

Reference numeral 11 denotes a flexible printed circuit board ("FPC") used for inputs/outputs of an electric signal to/from the image pickup element 8 held by the holding frame 10. The FPC 11 is arranged between the inner wall formed by the rear barrel 13 and the rear cover 14, and the holding frame 10.

Reference numeral 17 denotes a slider (contact member) positioned and fixed onto the rear barrel 13 that is made by joining a magnet with the friction material. An oscillator 18 includes an electromechanical energy conversion element and a plate-shaped elastic member on which vibrations are excited by the electromechanical energy conversion element, and is positioned and fixed onto the holding frame 10.

The elastic member of the oscillator 18 is ferromagnetic, and as the ferromagnetic member is attracted by a magnet of the slider 17, the pressed contact surface of the friction material of the slider 17 is compressed against two pressed contact surfaces that are aligned in the optical axis direction in the elastic member of the oscillator 18.

In the oscillation-type linear actuator that includes the slider 17 and the oscillator 18, two frequency signals (pulsed signal or alternate signal) having different phases are input to the electromechanical energy conversion element via the FPC (not illustrated). Thereby, an approximate ecliptic motion occurs on the pressed contact surface of the oscillator 18, and a driving force in the optical axis direction occurs on the pressed contact surface of the slider 17. The sliders 17 and 21 are arranged approximately parallel to the optical axis direction.

The linearly moving fifth lens unit L5 and image pickup element unit 30 are configured as one unit, and constitute a linear driving unit U1.

Figure 4:
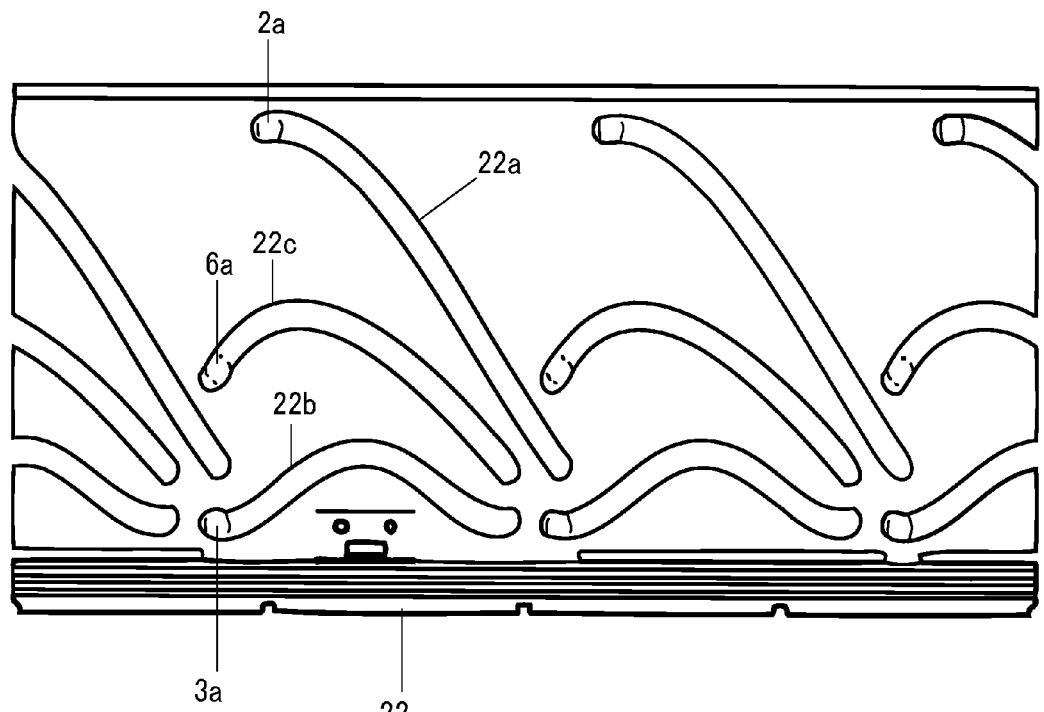
FIG. 4 is an exploded view of cam grooves in a cam ring illustrated in FIG. 2.
Figure 5:
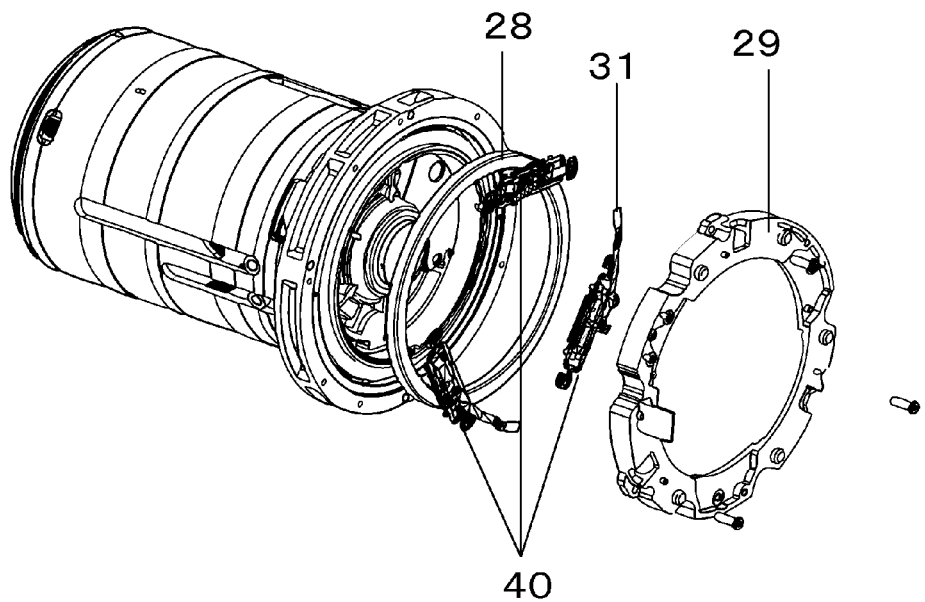
FIG. 5 is a partially exploded perspective view of the lens barrel illustrated in FIG. 1.

FIG. 4 is an exploded view of the cam grooves of the cam ring 22, and FIG. 5 is an exploded perspective view of the back portion of the cam ring driving unit. The cam ring 22 is positioned and rotatably held onto the inner circumference of the fixed barrel 12.

The cam ring 22 includes perforating grooves on a surface orthogonal to the optical axis, i.e., a first cam groove portion 22a used to drive the second lens unit L2 in the optical axis direction, a second cam groove portion 22b used to drive the third lens unit L3 in the optical axis direction, and a third cam groove portion 22c used to drive the stop/shutter unit in the optical axis direction. These cam groove portions are engaged with the cam followers 2a, 3a, and 6a integrally provided to each unit at regular angular intervals of approximate 120°, and the cam followers are engaged with the perforation grooves 12c and 12d corresponding to each unit parallel to the optical axis provided at regular angular intervals of approximate 120°.

When the cam ring 22 rotates around the optical axis relative to the fixed barrel 12 in the magnification variation, the second lens unit L2, the third lens unit L3, and the stop/shutter unit 6 can be moved back and forth in the optical axis direction for magnification variations.

Reference numeral 28 denotes a slider (contact member) positioned and fixed onto the cam ring that is made by joining a magnet with a friction material. An oscillator 40 includes an electromechanical energy conversion element and a plate shaped elastic member on which vibrations are excited by the electromechanical energy conversion element, and the oscillators 40 are positioned and fixed onto the cam ring press plate 29 at regular angular intervals of approximate 120°.

The elastic member of the oscillator 40 is ferromagnetic, and as the ferromagnetic member is attracted by a magnet of the slider 28, the pressed contact surface of the friction material of the slider 28 is compressed against the two pressed contact surfaces that are aligned in the optical axis direction in the elastic member of the oscillator 40.

In the oscillation-type linear actuator that includes the slider 28 and the oscillator 40, two frequency signals (pulsed signal or alternate signal) having different phases are input to the electromechanical energy conversion element via the FPC 31. Thereby, an approximate ecliptic motion occurs on the pressed contact surface of the oscillator 40, and a driving force occurs in the pressed contact surface of the slider 28 in the tangential direction of the rotation of the cam ring 22. The cam ring 22 is rotated through synchronous driving control of the oscillation-type linear actuators arranged at regular angular intervals of approximately 120°.

A rotational position detector (not illustrated) configured to detect a rotational amount of the cam ring 22 is provided on the inner circumference side of the cam ring 22, to detect an output signal corresponding to the rotational amount of the cam ring 22, and to perform operational processing for the output signal.

The second lens unit L2, the third lens unit L3, and the stop/shutter unit 6 are configured into one unit by the cam ring driving mechanism, and constitute the cam ring driving unit U2.

Figure 6:
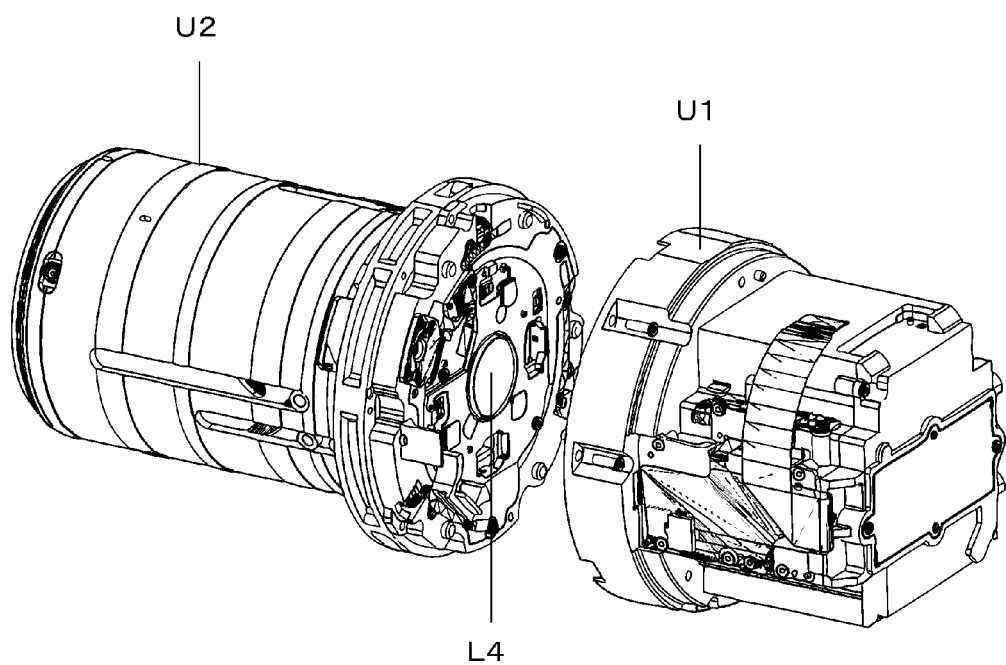
FIG. 6 is an exploded perspective view of the lens barrel illustrated in FIG. 1.

FIG. 6 is an exploded perspective view of a linear driving unit U1 and a cam ring driving unit U2. The shift unit 4 is screwed onto the cam ring driving unit U2, and the lens barrel is made by screwing the linear driving unit U1 and the cam ring driving unit U2 with each other. As a result, the cam ring driving unit U2 is arranged on the object side of the shift unit 4, the linear driving unit U1 is arranged on the image pickup element side, and the lens barrel can be divided into the cam ring driving unit U2, the linear driving unit U1, and the shift unit 4.

This embodiment reduces a sliding load by allowing the image pickup element 8 and a plurality of lens units configured to change the focal length to move in the optical axis direction in the magnification variation, instead of allowing a single lens unit to move in the optical axis direction. Thereby, this embodiment can reduce the sliding sounds (noises) in the zooming and in the motion image photography.

At this time, the optical units configured to vary a focal length is driven separately from driving of the cam ring or linear driving of the image pickup element, and the focal length is changed in the magnification variation by synchronizing the rotational driving of the cam ring 22 with the linear driving of the holding frame 10 through electric control. Since the image pickup element 8 is not driven by the cam ring, a large size of the diameter of the lens barrel caused by a maximum external size from the two-unit lenses (or the second, third lens units L2, L3) to the image pickup element can be prevented. In addition, an increase of a mechanical load by the image pickup element can be prevented.

In this embodiment, both of the driving source used to rotate the cam ring 22 of the cam ring driving unit U2 and the driving source used to drive the holding frame 10 of the linear driving unit U1 are oscillation-type linear actuators (ultrasonic actuators). However, at least one of these driving sources may be an oscillation-type linear actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162564, filed Jul. 20, 2010, which is hereby incorporated by reference herein in its entirety.

What is claimed is:

1. A lens barrel comprising:
a cam ring driving unit including a moving frame that is configured to hold a lens unit and includes a cam follower, and a cam ring that includes a cam groove engaged with the cam follower, the cam ring being configured to rotate around the optical axis and thereby to drive the lens unit in an optical axis direction;
a linear driving unit that includes a holding frame configured to hold an image pickup element configured to provide a photoelectric conversion to an optical image of an object, and a guide bar that is engaged with the holding frame, extends in the optical axis direction, and is configured to guide a linear movement of the holding frame in the optical axis direction; and
an intermediate fixing lens unit configured still in the optical axis direction,
wherein the cam ring driving unit is arranged on an object side of the intermediate fixing lens unit, the linear driving unit is arranged on an image pickup element side of the intermediate fixing lens unit, and the lens barrel is configured dividable into the cam ring driving unit, the linear driving unit, and the intermediate fixing lens unit.

2. The lens barrel according to claim 1, wherein a focal length is changed by synchronizing rotational driving of the cam ring with linear driving of the holding frame.

3. The lens barrel according to claim 1, wherein at least one of a driving source used to rotate the cam ring in the cam ring driving unit and a driving source used to drive the holding frame of the linear driving unit is an oscillation-type linear actuator.

4. An optical unit comprising a lens barrel according to claim 1.

* * * * *